UNITED STATES PATENT OFFICE.

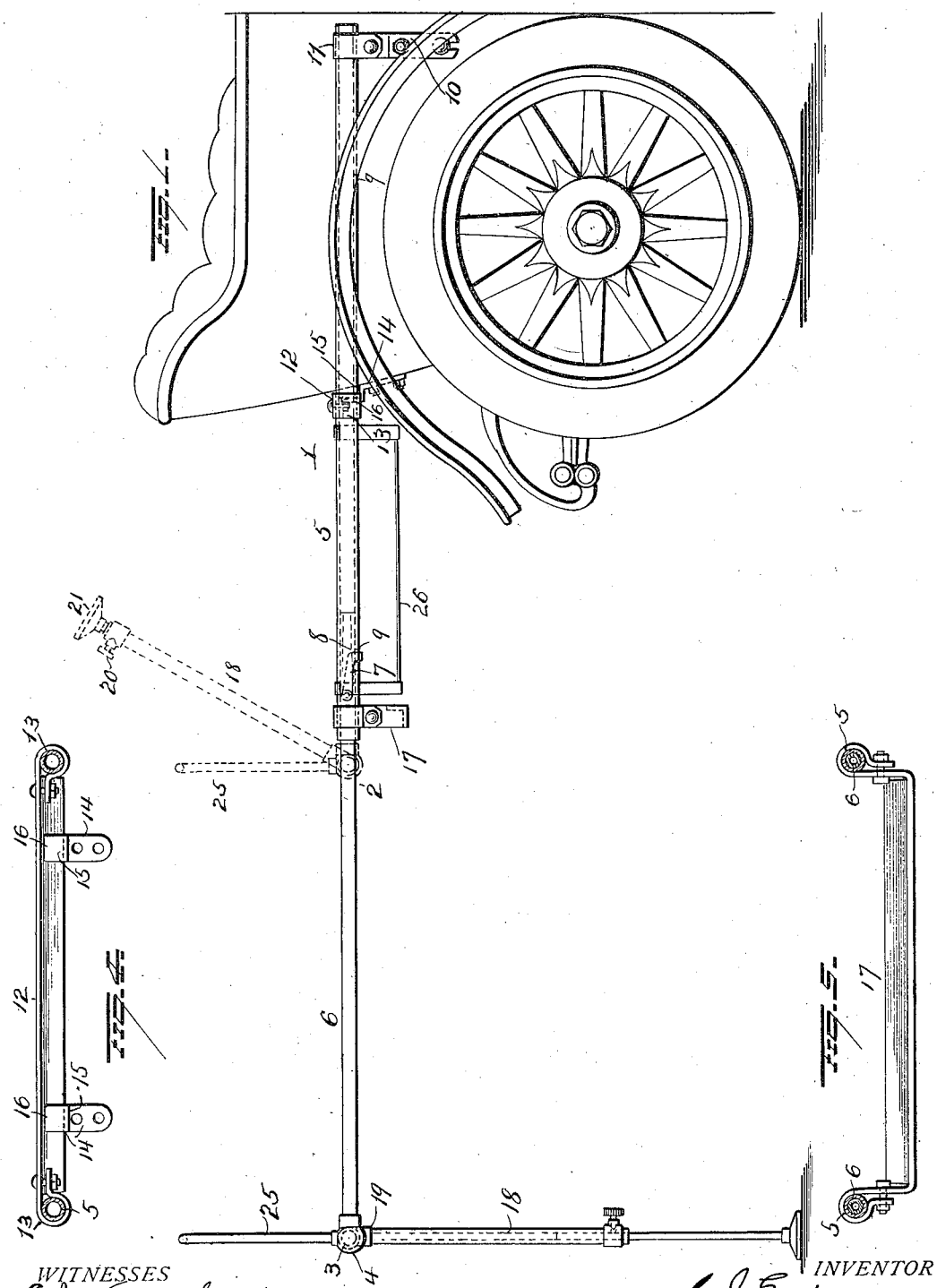

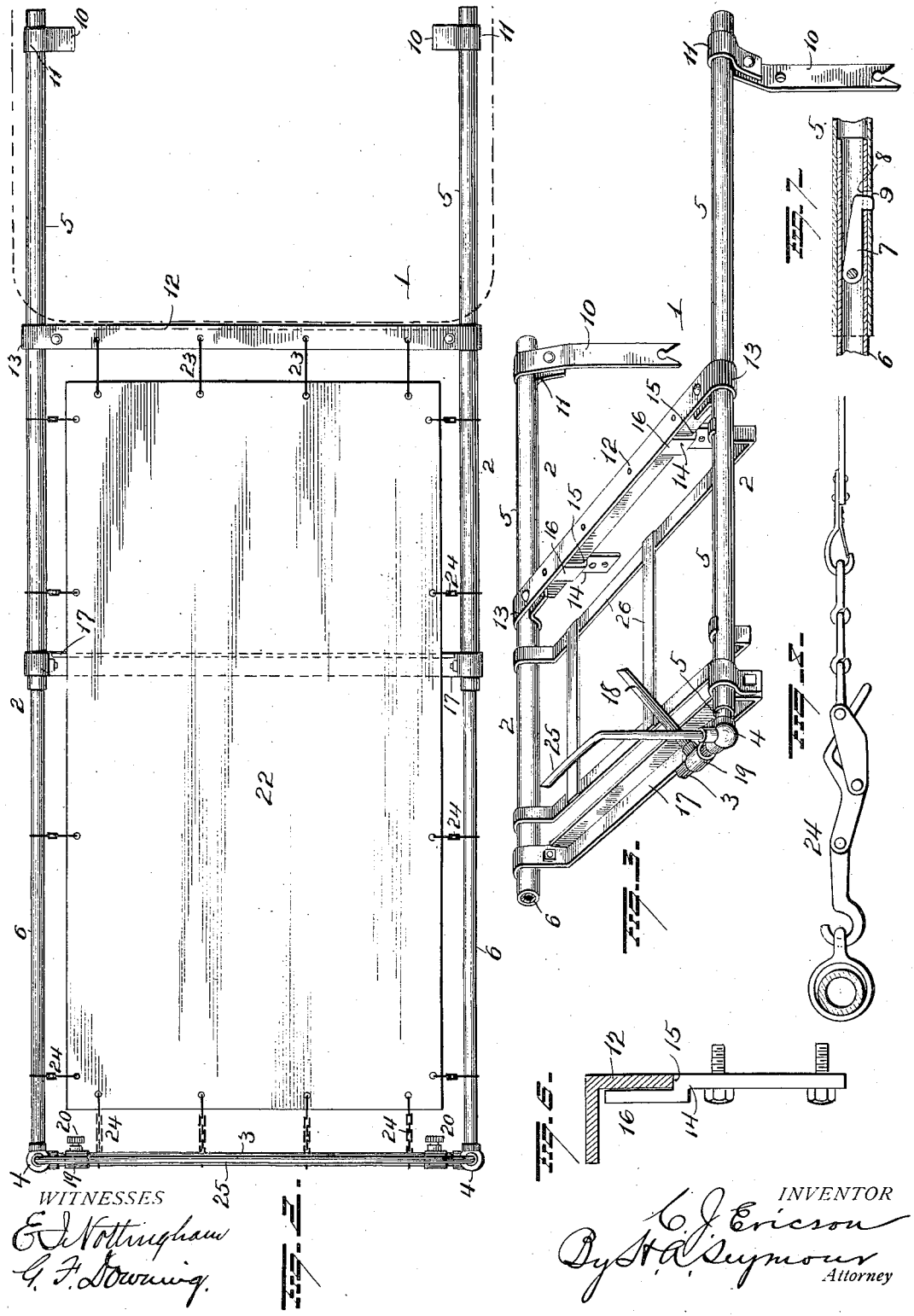

CHARLES J. ERICSON, OF SALT LAKE CITY, UTAH.

COMBINED BED AND BAGGAGE-CARRIER.

1,150,106.  Specification of Letters Patent.  Patented Aug. 17, 1915.

Application filed September 30, 1914. Serial No. 864,326.

*To all whom it may concern:*

Be it known that I, CHARLES J. ERICSON, a citizen of the United States, and a resident of Salt Lake City, in the county of Salt Lake and State of Utah, have invented certain new and useful Improvements in Combined Beds and Baggage-Carriers; and I do hereby declare the following to be a full, clear, and exact description of the invention, such as will enable others skilled in the art to which it appertains to make and use the same.

This invention relates to a combination bed and baggage carrier attachment for vehicles,—one object of the invention being to provide a simple structure which may be readily attached to an automobile and quickly adjusted for use either as a baggage carrier or a bed.

With this and other objects in view, the invention consists in certain novel features of construction and combinations of parts as hereinafter set forth and pointed out in the claims.

In the accompanying drawings, Figure 1 is a side view showing an application of my improvements. Fig. 2 is a plan view illustrating the frame of the device extended and a bed bottom attached thereto. Fig. 3 is a detail perspective view of a portion of the device, showing connecting means for attachment to an automobile, Figs. 4 and 5 are transverse sectional views; Fig. 6 is an enlarged detail view showing the spreader 12 in section and one of the brackets 14 in side elevation; Fig. 7 is a detail sectional view the relation of the latch 7 to the tubular members 5 and 6, and Fig. 8 is an enlarged detail view of one of the stretchers 24.

1 represents a rectangular frame comprising side bars 2, 2, and a cross-bar 3 connected with the rear ends of the side bars by means of suitable couplings 4. Each side-bar of the frame is extensible, the same comprising tubular members 5—6 telescoping one within the other. The frame 1 is thus made telescopic so that it may be extended sufficiently to form a bed-frame, or so that it may be collapsed or contracted to form a baggage carrier, as more fully hereinafter explained. In order that the extensible frame may be rigidly held in the position to which it may be adjusted, latches 7 are provided. These latches are pivotally mounted in the tubular sections 6 and project through holes 8 in the walls thereof and through suitably located holes 9 in the wall of the side-bar sections 5.

Near the forward ends of the side-bars of the frame, bracket-arms 10 are located, each of said arms being provided at its upper end with a clamp 11 whereby the same is secured to the frame-bar and the lower portions of said bracket-arms are suitably bent so that they may lie flat against the sides of the rear portion of an automobile or other vehicle body, to which they may be secured by any suitable fastening means.

Rearwardly of the connection of the frame-bars with the vehicle, a cross-bar or spreader 12 extends from one frame-bar to the other, said cross-bar or spreader being preferably constructed of angle-iron and provided at its ends with clamps 13 for securing the same to the frame-bars. When the frame 1 is placed on a vehicle, the cross-bar or spreader will be disposed in close proximity to a vertical member of the vehicle, such, for example, the back of the seat portion, and is connected therewith by means of brackets 14. Each bracket 14 may be bolted to the rear of the seat back of the vehicle, and is formed with a shoulder 15 to receive the lower edge of the depending flange of the cross-bar or spreader and with an upwardly projecting lip 16 to engage the rear side face of said flange.

In rear of the cross-bar or spreader 12, the upright arms of a depending yoke 17 are secured to the frame-bars. The horizontal body portion of this yoke may consist of angle iron and the arms of the yoke may be of sufficient length to permit the horizontal body portion to rest upon the rear portion of the vehicle body when frame 1 is disposed in a horizontal position and assist in supporting the frame in such position. The yoke 17 serves as a spreader or transverse brace which, when the attachment is applied to a vehicle body of the type shown in the drawing, will be disposed some distance rearwardly of said body. In any case, the cross bar of the yoke is sufficiently depressed below the plane of the frame as not to interfere with the bed bottom attached to said frame, as hereinafter described.

When the frame 1 is extended sufficiently to form a bed frame, its rear end will be supported on legs 18. Each leg 18 comprises telescopic sections to permit vertical adjustment,—the upper section being loosely connected with the rear cross-bar of the frame, through the medium of a coupling 19, and the two sections being secured together at any desired adjustment by means of a screw-clamp 20. In order to prevent the legs from sinking into soft ground, they may be provided with broad feet 21.

A suitable fabric bed bottom 22 is supported in the frame 1,—one end of said bed-bottom being connected with the cross-bar or spreader 12, by means of hooks 23, while the rear end is connected with the rear-cross-bar 3 of the frame by means of a series of stretchers 24. Similar stretchers 24 are also employed for connecting the side edges of the bed-bottom with the side-bars of the frame 1.

A foot guard 25 is located at the frame and may serve to support the rear portion of a tarpaulin which may be employed to inclose the bed and its occupant,—the forward portion of said tarpaulin being thrown over the hood or top of the vehicle.

When my improvements are applied to an automobile and adjusted to afford a bed as above explained, ready access to the bed may be afforded by the usual opening in the back of the automobile hood or top, and the seat portion and hood or top of the car will afford (when the curtains are in place) a convenient dressing room.

To convert the device into a baggage carrier, the bed bottom will be removed from the frame, and the latter will then be collapsed to its smallest dimensions. The bed-bottom and its attaching devices may then be rolled into compact form and placed on the frame, together with trunks and other luggage. The legs 18 may now be made to extend over the baggage and serve to hold the baggage in place, when said legs and the luggage are also secured by a limited amount of lashing rope. A rack 26 may be suspended from the side bars of the frame to increase the carrying capacity of the attachment.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:

1. A convertible bed and baggage carrier, comprising a longitudinally extensible frame adapted when extended to support a bed bottom, means for attaching said frame to a vehicle, and supports loosely connected with the rear end of said frame, said supports adapted to serve also as holding means for baggage when the device has been converted into a baggage carrier.

2. A convertible bed and baggage carrier for vehicles, comprising a longitudinally extensible frame adapted when extended to support a bed bottom, and longitudinally extensible supports adjustably attached to the free end of the frame, said supports adapted to serve also as holding means for baggage.

3. In a device of the character described, the combination with a frame made extensible to form a bed frame, of means for securing the same in a horizontal position to the rear portion of a vehicle, a bed-bottom, means for connecting said bed-bottom with said frame, a foot guard at the rear end of said frame, and legs or supports connected to said rear portion of the frame and foldable over the frame when the latter is collapsed to form holding means for luggage.

In testimony whereof, I have signed this specification in the presence of two subscribing witnesses.

CHARLES J. ERICSON.

Witnesses:
HAMPDEN S. BEATIE,
J. E. BLOMQUIST.